United States Patent [19]

Brown, Jr.

[11] 4,015,549
[45] Apr. 5, 1977

[54] HERBICIDE TANK TRAILER

[76] Inventor: Owen J. Brown, Jr., R.R. 2, Pittsfield, Ill. 62363

[22] Filed: Dec. 3, 1975

[21] Appl. No.: 637,153

[52] U.S. Cl. .................................. 111/8; 111/1; 111/7; 280/423 B
[51] Int. Cl.² .................................. A01C 7/08
[58] Field of Search ............... 111/1, 6, 7, 62, 66, 111/67, 85, 52, 53, 54, 55, 59, 60, 61, 64, 8; 280/406 A, 407 R, 414 R, 414.5, 416, 423, 411 A, 411 C, 425 R, 423 B, 425 A, 498, 408, 409, 410, 280, 492; 172/677, 679, 195, 175; 239/172

[56] References Cited

UNITED STATES PATENTS

| | | | |
|---|---|---|---|
| 2,393,016 | 1/1946 | Black | 240/423 R |
| 2,842,899 | 7/1958 | Padrick | 111/7 |
| 3,177,828 | 4/1965 | Cramer | 111/52 |
| 3,295,482 | 1/1967 | Dountas et al. | 111/7 |
| 3,396,685 | 8/1968 | Meiners | 111/7 |
| 3,413,014 | 11/1968 | Franz | 280/414 R |
| 3,443,826 | 5/1969 | Hermiz | 280/492 |
| 3,698,740 | 10/1972 | Chisholm et al. | 280/423 B |
| 3,752,092 | 8/1973 | Vinyard | 111/7 |
| 3,790,189 | 2/1974 | Winter | 280/423 R |
| 3,796,443 | 3/1974 | Crutchfield | 280/423 R X |
| 3,840,252 | 10/1974 | Jocoy | 280/415 A |

FOREIGN PATENTS OR APPLICATIONS

| | | | |
|---|---|---|---|
| 580,708 | 8/1958 | Italy | 280/415 R |

Primary Examiner—Edgar S. Burr
Assistant Examiner—James R. Feyrer
Attorney, Agent, or Firm—Clarence A. O'Brien; Harvey B. Jacobson

[57] ABSTRACT

A trailer for towing behind a wide multi-row earth working farm implement coupled behind a farm tractor is provided and includes a wheeled frame, a large capacity liquid herbicide tank supported from the frame and centered in a front-to-rear extending direction relative to the supporting wheels of the frame, and a tongue portion projecting forwardly from the frame and including a low forward end portion removably coupled to a central frame portion of the associated multi-row earth working implement. The tongue portion includes an elevated elongated front-to-rear extending portion disposed to the rear of the low forward end portion and a forward upstanding portion extends between the low forward end portion and the forward end of the elevated portion while a rear upstanding portion extends between a forward portion of the main frame of the trailer and the rear end of the elevated tongue portion, the effective horizontal spacing between the trailer frame and the low forward end portion of the trailer tongue being greater than one-half the width of the wide multi-row earth working farm implement.

4 Claims, 6 Drawing Figures

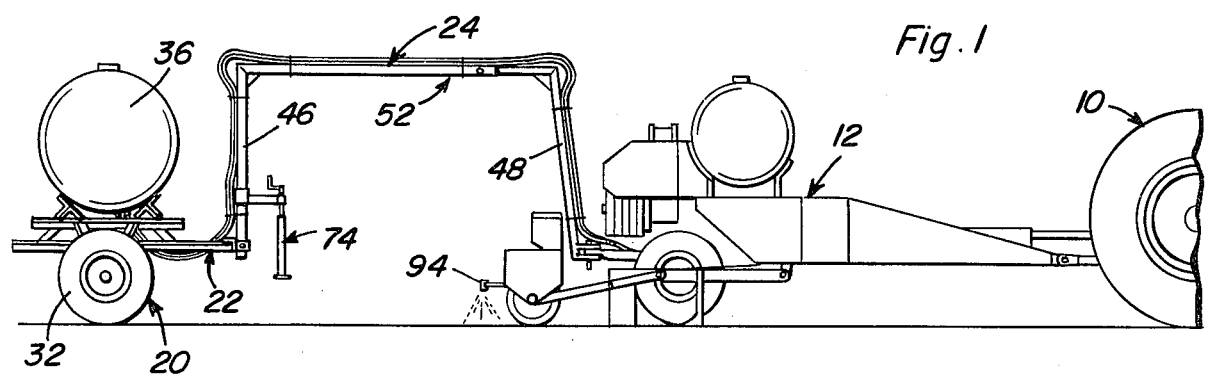
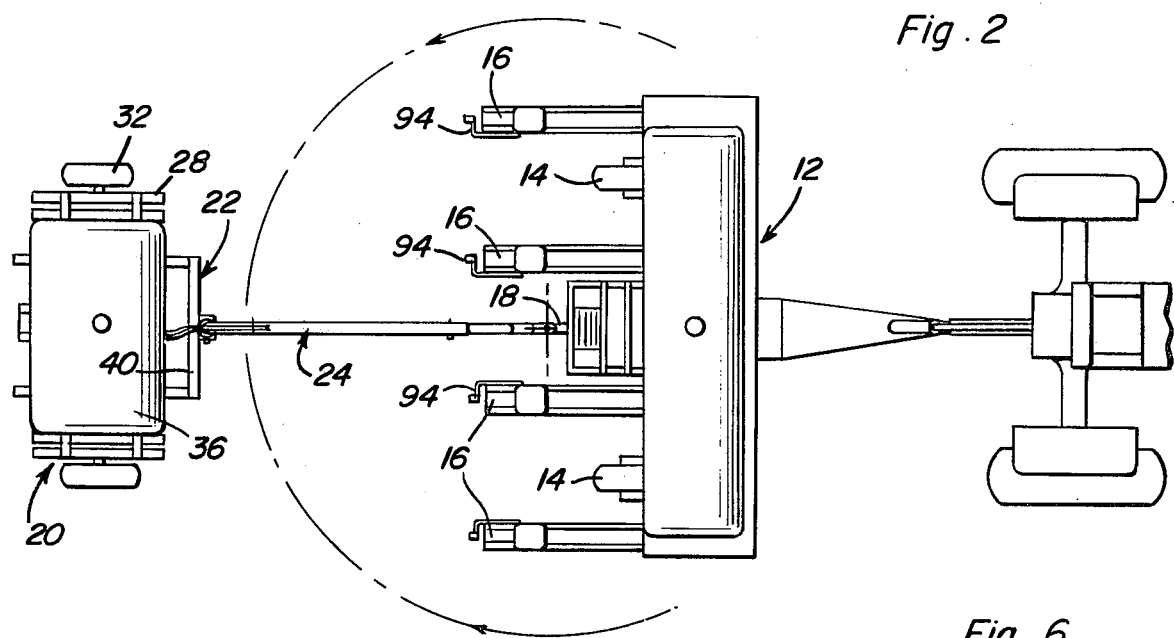
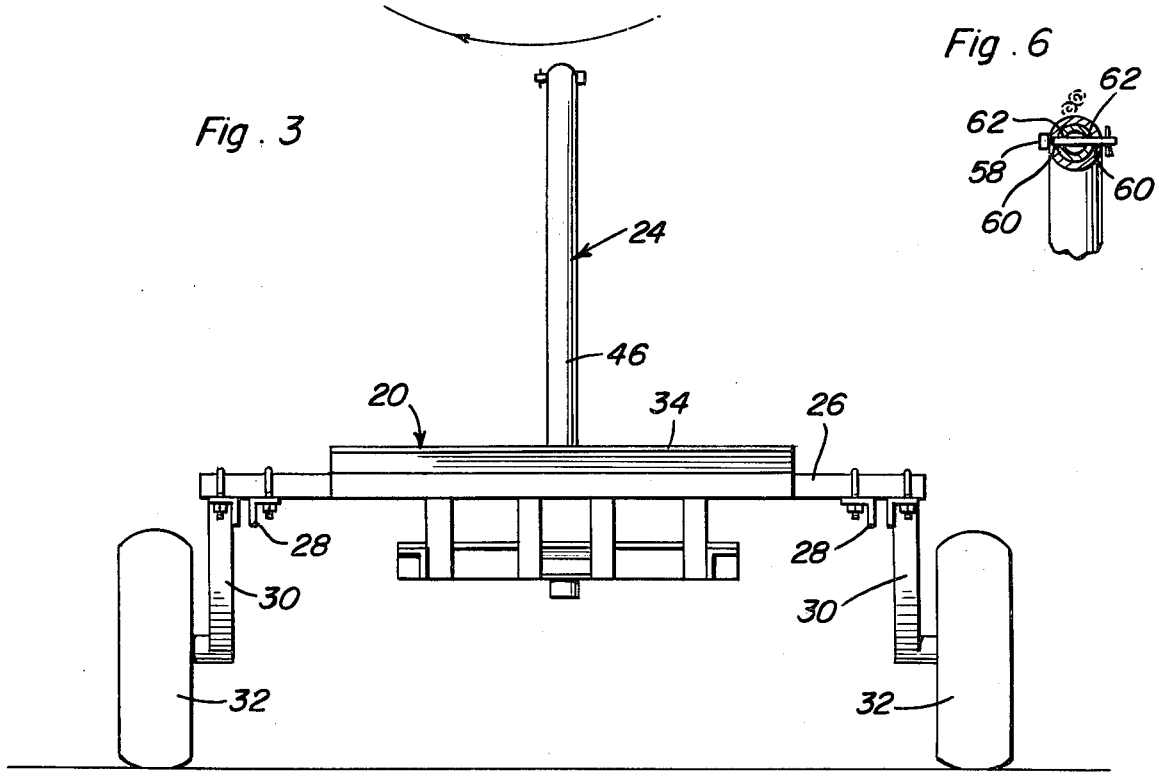

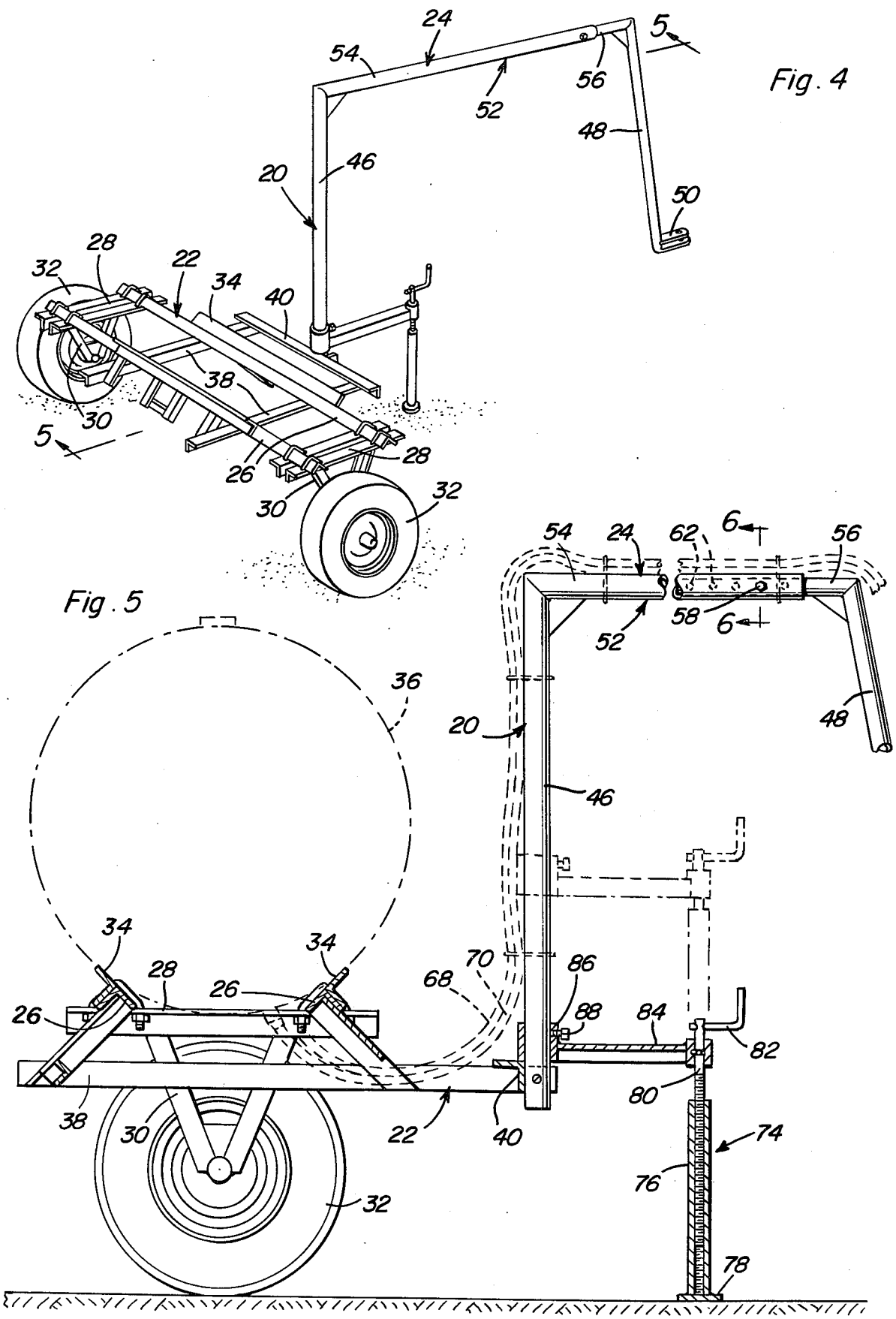

HERBICIDE TANK TRAILER

BACKGROUND OF THE INVENTION

In many instances it is desirable for a multi-row planter to be capable of seed planting, fertilizing and the application of liquid herbicide in a single pass. Accordingly, some multi-row planters are provided with seed bins for containing seed to be planted, fertilizer boxes and herbicide tanks. However, the weight represented by a reasonable supply of liquid herbicide (as for example 500 gallons) cannot be carried on conventional planters. Thus, the volume of liquid herbicide which may be carried on conventional planters is severely limited and frequent stops are therefore required to replenish the supply of liquid herbicide and a tank vehicle of the desired capacity must be provided and operable over farm land in order to transport a continuing supply of liquid herbicide to a planter. Also, a planter equipped with reasonably small volume liquid herbicide tanks is limited, by the herbicide tanks, in its capacity to carry fertilizer. Accordingly, if liquid herbicide tanks can be omitted from a planter, larger fertilizer boxes may be carried on the planter.

In addition to liquid herbicide tanks being provided on planters, it is possible to mount liquid herbicide tanks on a tractor being utilized to tow a planter. However, if a reasonable supply of liquid herbicide is to be carried by a tractor, a larger heavy duty tractor is required to carry the additional weight represented by the liquid herbicide. Further, the mounting of liquid herbicide tanks on a tractor necessitate that the tanks be removed and reinstalled seasonally, limits the use of one planter to a single tractor, results interruption of the planting operation as a result of tractor breakdown, overloads the tractor and increases the tendency of the tractor to become stuck in soft ground and requires that a replenishing supply of liquid herbicide be hauled to the tractor.

Various forms of tank trailers have been heretofore designed and other types of trailers have included gooseneck towing tongues. Examples of several forms of tank trailers and other trailers equipped with gooseneck towing tongues are disclosed in U.S. Pat. Nos. 2,842,899, 3,295,482, 3,396,685, 3,698,740, 3,796,433 and 3,840,252.

BRIEF DESCRIPTION OF THE INVENTION

The tank trailer of the instant invention includes a large capacity tank generally centered over the wheels of the trailer and also a gooseneck towing tongue having an elevated front-to-rear extending intermediate portion of sufficient effective horizontal length to span one-half the width of a wide multi-row planter to whose central portion the forward end of the goose-neck trailer tongue is coupled. In this manner, the planter, as pulled by the associated farm tractor, may negotiate sharp turns at the ends of the rows being planted without interference between the opposite side portions of the planter and the tongue portion of the trailer, even though the tongue portion of the trailer may be swung to a position disposed at substantially 90° relative to the associated multi-row planter.

The trailer includes a forward vertically retractable landing leg and the effective length of the upper elevated front-to-rear extending portion of the gooseneck tongue may be adjusted in effective length as required by the width of the associated multi-row planter.

The main object of this invention is to provide a liquid herbicide tank trailer for towing behind a multi-row planter and of a capacity greater than that which could be carried on the tractor or the planter.

Another object of this invention is to provide a liquid herbicide trailer including a high gooseneck towing tongue and for attachment to a central frame portion of an associated wide multi-row planter with the effective horizontal length of the elevated portion of the gooseneck towing tongue being greater than one-half the width of the multi-row planter.

Another object of this invention, in accordance with the immediately preceding object, is to provide a herbicide tank trailer including a longitudinally extendible elevated gooseneck tongue portion.

Another important object of this invention is to provide a herbicide tank trailer for use behind a wide multi-row planter and equipped with a forward downwardly extendible and upwardly retractable landing leg.

A final object of this invention to be specifically enumerated herein is to provide a tank trailer in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of a conventional form of planter with the herbicide trailer of the instant invention removably coupled to a central rear portion of the planter;

FIG. 2 is a top plan view of the assemblage illustrated in FIG. 1;

FIG. 3 is a rear elevational view of the tank trailer with the tank portion thereof removed;

FIG. 4 is a perspective view of the tank trailer;

FIG. 5 is an enlarged longitudinal vertical sectional view, taken substantially upon the plane indicated by the section line 5—5 of FIG. 4, and with portions of the upper horizontal portion of the tongue of the trailer being broken away; and FIG. 6 is an enlarged fragmentary transverse vertical sectional view, taken substantially upon the plane indicated by the section line 6—6 of FIG. 5.

DETAILED DESCRIPTION OF THE INVENTION

Referring now more specifically to the drawings, the numeral 10 generally designates a farm tractor behind which a conventional form of planter referred to in general by the reference numeral 12 is removably coupled. The planter 12 includes ground engaging support wheels 14 and elevatable and lowerable press wheels 16, the planter is comprising a four-row planter. The planter 12 further includes a central rear frame portion 18.

The herbicide trailer of the instant invention is referred to in general by the reference numeral 20 and consists of a main frame referred to in general by the reference numeral 22 and a gooseneck tongue assembly referred to in general by the reference numeral 24. The frame 22 includes front and rear transverse members 26 interconnected at corresponding ends by means of front-to-rear extending end assemblies 28 and each end assembly 28 includes a depending support frame 30 from which a corresponding side ground engaging support wheel 32 is rotatably journaled. The transverse members 26 include longitudinally extending saddle elements 34 supported therefrom and a large capacity liquid tank 36 is supported from and cradled by the saddle elements 34. The central portions of the transverse members 26 are also interconnected by means of transversely spaced front-to-rear extending members 38 and the forward ends of the members 38 project forwardly of the front transverse member 26 and are interconnected by means of a transverse brace 40.

The tongue assembly 24 includes a rear upstanding member 46 having its lower end supported from the midportion of the transverse brace 40, a forward upstanding member 48 whose lower end includes a coupling assembly 50 defining a low forward end portion of the tongue assembly 24 and which is removably coupled to the central rear frame portion 18 of the planter 12. The upper ends of the upstanding members 46 and 48 are interconnected by means of an elevated central portion of the tongue assembly 24 referred to in general by the reference numeral 52 and including a large diameter tubular member 54 projecting forwardly of the upper end of the upright member 46 and a smaller diameter tubular member 56 projecting rearwardly from the upper end of the upright member 48. The front and rear ends of the tubular members 54 and 56 are telescopingly engaged and a fastener 58 is removably secured through aligned radial bores 60 formed in the forward end of the tubular member 54 and a selected pair of aligned radial bores 62 formed through the tubular member 56, the latter being provided with a plurality of longitudinally spaced pairs of aligned radial bores 62 for registry with the radial bores 60. Accordingly, the effective length of the upper horizontal portion 52 of the tongue assembly 24 may be adjusted.

The tank 36 may be secured to the frame 22 in any convenient manner and a pair of outlet and return lines 68 and 70 have corresponding inlet and outlet ends, respectively, supported from fittings opening through the bottom of the tank 36. The lines 68 and 70 extend along the upstanding member 46, the upper horizontal member 52 and the upstanding member 48 of the tongue assemblly 24 and have their front ends suitably coupled to the herbicide pump provided on the planter 12.

The forward transverse brace 40 of the frame 22 includes an upstanding landing leg assembly referred to in general by the reference numeral 74 and the landing leg assembly 74 comprises a lower internally threaded sleeve portion 76 equipped with a horizontally enlarged foot 78 at its lower end an upper screw member 80 equipped with a crank handle 82 at its upper end and journaled from the forward end of a support arm 84 having its rear end mounted to a support sleeve 86 rotatable and slidable on the upright member 46, but releasably securable in position thereon by means of a threaded set screw 88 carried by the sleeve 86. Accordingly, the landing leg assembly 74 may be raised and lowered by sliding the sleeve 86 up and down the upright member 46 and after the sleeve 86 has been secured in a lower position by means of the set screw 88, the screw member 80 may be turned so as to adjust the ground clearance of the coupling assembly 50, as desired. Further, the effective length of the upper portion 52 of the tongue assembly 24 may be adjusted as desired in order to insure that the horizontal spacing between the coupling assembly 50 and the front portion of the frame 22 of the trailer 20 will be greater than the distance between the longitudinal center line of the planter 12 and the outer side press wheels 16. Accordingly, the trailer 20 will be capable of being disposed at right angles relative to the planter 12 without interference between any portion of the tongue assembly 24 or the frame 22 and adjacent portions of the planter 12.

The herbicide pump (not shown) on the planter receives herbicide from tank 36 through line 68 and discharges to the herbicide spray units 94 and also through a pressure relief valve (not shown) into line 70 extending back to the tank 36. Thus, excess herbicide pumped from tank 36 is pumped back into the tank 36 in order to agitate the herbicide in the tank.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is as follows:

1. In combination with a farm draft vehicle and a wide multi-row ground wheel supported trailer-type planter coupled behind said draft vehicle and including a central frame portion and transversely spaced trailing press wheels disposed rearwardly of said central frame portion, a liquid tank trailer including ground engaging support wheels and a low main frame from which said wheels are supported, a large capacity liquid tank supported from said frame, said trailer including a forwardly projecting towing tongue having a low forward end portion and an elevated elongated front-to-rear extending portion disposed to the rear of said forward end portion, upstanding means connecting the front end of said front-to-rear extending portion to said low forward end portion, means connecting the rear end of said front-to-rear extending portion to said trailer main frame, the effective horizontal distance between said main frame and said low forward end portion of said trailer tongue being greater than the distance from said central frame portion to either outer side of said planter, said low forward end portion being coupled to said central frame portion at a point spaced forward of said press wheels and rearward of the ground wheels of the planter.

2. The combination of claim 1 wherein said elevated front-to-rear extending portion includes relatively extendible and retractable opposite end portions and means operative to retain said opposite end portions in adjusted relative extended positions thereof.

3. The combination of claim 1 wherein said means connecting the rear end of said front-to-rear extending portion to said trailer frame includes an upright structural member having its upper and lower ends connected to said rear end of said front-to-rear extending portion and said frame, respectively, a depending landing leg having its upper end mounted on said upright structural member for adjustable positioning therealong, and means operative to releasably retain said upper end in adjusted position along said upright structure member.

4. The combination of claim 3 wherein said depending landing leg includes relatively extendible and retractable upper and lower end portions.

* * * * *